(12) United States Patent
Dupret et al.

(10) Patent No.: US 9,466,938 B2
(45) Date of Patent: Oct. 11, 2016

(54) DEVICE FOR MEASURING AND CONTROLLING THE WAVE-FRONT OF A COHERENT LIGHT BEAM

(71) Applicant: COMMISSARIAT A L'ENERGIE ATOMIQUE ET AUX ENERGIES ALTERNATIVES, Paris (FR)

(72) Inventors: Antoine Dupret, Orsay (FR); Sylvain Gigan, Paris (FR); François Ramaz, Le Kremlin-Bicêtre (FR); Gilles Tessier, Paris (FR); Arnaud Verdant, Saint Nazaire les Eymes (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/649,511

(22) PCT Filed: Dec. 4, 2013

(86) PCT No.: PCT/FR2013/052936
§ 371 (c)(1),
(2) Date: Jun. 3, 2015

(87) PCT Pub. No.: WO2014/087099
PCT Pub. Date: Jun. 12, 2014

(65) Prior Publication Data
US 2015/0325973 A1    Nov. 12, 2015

(30) Foreign Application Priority Data
Dec. 4, 2012  (FR) ..................................... 12 61594

(51) Int. Cl.
*G02F 1/13* (2006.01)
*H01S 3/00* (2006.01)
(Continued)

(52) U.S. Cl.
CPC ............... *H01S 3/0085* (2013.01); *G01J 9/02* (2013.01); *G02F 1/13318* (2013.01);
(Continued)

(58) Field of Classification Search
None
See application file for complete search history.

(56) References Cited

U.S. PATENT DOCUMENTS

| 4,595,292 A | 6/1986 | Amodeo |
| 5,042,922 A | 8/1991 | Pepper |

(Continued)

FOREIGN PATENT DOCUMENTS

| EP | 0135003 A2 | 3/1985 |
| FR | 2753544 A1 | 3/1998 |

(Continued)

OTHER PUBLICATIONS

Meng Cui and Changhuei Yang, "Implementation of a digital optical phase conjugation system and its application to study the robustness of turbidity suppression by phase conjugation", Published Feb. 2, 2010, pp. 3444-3455, vol. 18, No. 4, Optics Express.
(Continued)

*Primary Examiner* — Richard Kim
(74) *Attorney, Agent, or Firm* — Kevin R. Erdman; Brannon Sowers & Cracraft PC (57) ABSTRACT

The invention concerns a system for measuring and controlling the wave-front of a coherent light beam (32), comprising: a device for generating a reference light beam (36) that is coherent with said coherent light beam (32); a partially reflective monolithic device (38) comprising an array of elementary cells, each elementary cell comprising at least one element (40) for measuring a portion of the incident wave interfering between the coherent light beam and the reference light beam and a phase modulation element (42) for modulating the phase of the reflected beam; and a control device (46) for controlling said phase modulation element making use of the information from the associated measuring element.

20 Claims, 4 Drawing Sheets

(51) Int. Cl.
| | |
|---|---|
| *G02F 1/1343* | (2006.01) |
| *G02F 1/1335* | (2006.01) |
| *G01J 9/02* | (2006.01) |
| *G02F 1/133* | (2006.01) |
| *G03H 1/00* | (2006.01) |
| *G02B 26/06* | (2006.01) |
| *G02F 1/1347* | (2006.01) |
| *G03H 1/04* | (2006.01) |
| *G03H 1/02* | (2006.01) |

(52) U.S. Cl.
CPC .... *G02F 1/13439* (2013.01); *G02F 1/133528* (2013.01); *G03H 1/0005* (2013.01); *G03H 1/0443* (2013.01); *G02B 26/06* (2013.01); *G02F 1/1347* (2013.01); *G02F 1/133553* (2013.01); *G02F 2001/133531* (2013.01); *G02F 2201/122* (2013.01); *G02F 2201/123* (2013.01); *G02F 2203/02* (2013.01); *G02F 2203/12* (2013.01); *G02F 2203/18* (2013.01); *G02F 2203/50* (2013.01); *G03H 2001/0224* (2013.01); *G03H 2001/0445* (2013.01); *G03H 2225/32* (2013.01); *G03H 2226/11* (2013.01); *H01S 3/005* (2013.01)

(56) References Cited

U.S. PATENT DOCUMENTS

| | | |
|---|---|---|
| 5,994,687 A | 11/1999 | Chanteloup |
| 2004/0125380 A1 | 7/2004 | Pepper |

FOREIGN PATENT DOCUMENTS

| | | |
|---|---|---|
| WO | 0169651 A2 | 9/2001 |
| WO | 2011095662 A2 | 8/2011 |
| WO | 2012077606 A2 | 6/2012 |

OTHER PUBLICATIONS

Cindy Bellanger, Arnaud Brignon, Joseph Colineau, "Coherent fiber combining by digital holography", Journal, Published Jun. 2009, Proceedings of SPIE vol. 7195 71951N-8, Published by Optics Letters.

Ioannis N. Papadopoulos, Salma Farahi, Christophe Moser, Demetri Psaltis, "Focusing and scanning light through a multimode optical fiber using digital phase conjugation", Published Apr. 23, 2012, pp. 10583-10590, vol. 20, No. 10, Published by Optics Express.

S.M. Popoff, A. Aubry, G. Lerosey, M. Fink, A.G. Boccara, S. Gigan, "Exploiting the Time-Reversal Operator for Adaptive Optics, Selective Focusing and Scattering Pattern Analysis", Nov. 29, 2011, Paris France.

S.M. Popoff, G.Lerosey, R. Carminati, M. Fink, A.C. Boccara, S. Gigan, "Measuring the Transmission Matrix in Optics : An Approach to the Study and Control of Light Propagation in Disordered Media", Published 2010, pp. 1-5, Paris, France.

I. M. Vellekoop and A. P. Mosk, "Focusing coherent light through opaque strongly scattering media", Aug. 15, 2007, pp. 2309-2311, vol. 32, No. 16, Optics Letters, Enschede,The Netherlands.

I.M. Vellekoop and A.P. Mosk, "Phase control algorithms for focusing light through turbid media", Journal, pp. 1-28, Enschede, The Netherlands.

Seoung Hyun Kim, Dong Ki Min, and Yong Jei Lee, "Backside-illumination 14μm-pixel QVGA time-of-flight CMOS imager", pp. 325-328, Hwasung, South Korea.

Ido Bar-Tana, John P. Sharpe, Douglas J. McKnight, and Kristina M. Johnson, "Smart-pixel spatial light modulator for incorporation in an optoelectronic neural network", Feb. 1, 1995 pp. 303-305, vol. 20, No. 3, Optics Letters, Boulder, Colorado.

European Patent Office, International Search Report for PCT/FR2013/052936, Feb. 28, 2014.

Lin, et al, "Polarization-independent liquid crystal phase modulator using a thin polymer-separated double-layered structure", Optics Express, Oct. 31, 2005, pp. 8746-8752, vol. 13, No. 22.

DEVICE FOR MEASURING AND CONTROLLING THE WAVE-FRONT OF A COHERENT LIGHT BEAM

FIELD OF THE INVENTION

The present application is a National Stage of PCT International Application Serial Number PCT/FR2013/052936, filed Dec. 4, 2013, which claims priority under 35 U.S.C. §119 of French Patent Application Serial Number 12/61594, filed Dec. 4, 2012, the disclosures of which are incorporated by reference herein.

1. Background

The present invention relates to a device and a method for measuring and controlling the wavefront of a coherent light beam, for example, a laser beam. More specifically, the present invention relates to such a device enabling to measure and modulate the phase or the amplitude of such a wavefront.

2. Discussion of Related Art

Currently, coherent light, and in particular laser light, is used for many applications, for example for medical applications, in microscopy, or also for data processing with optical fibers. The wavefront of a laser beam depends on the type of medium that the laser beam has crossed. It may be advantageous to study the wavefront of a laser beam to determine the nature and the shape of the medium that it has crossed. It may also be provided, after finding out the shape of the wavefront, to modulate it so that the modulated wavefront is adapted to a given application.

U.S. Pat. No. 5,994,687 describes a system for controlling the wavefront of a laser beam.

SUMMARY

An object of an embodiment of the present invention is to provide a system overcoming all or part of the disadvantages of prior art.

To achieve this, a system according to an embodiment comprises an array of pixels which each provide, independently, the detection of a portion of the wavefront and the modulation of a corresponding portion of a reflected beam.

Thus, an embodiment provides a system for measuring and controlling the wavefront of a coherent light beam, comprising: a device for generating a reference light beam coherent with the coherent light beam; a partially reflective monolithic device comprising an array of elementary cells, each elementary cell comprising at least one element for measuring a portion of the incident wave interfering between the coherent light beam and the reference light beam and an element for modulating the phase of the reflected beam; and a phase modulation element control device making use of the information from the associated measurement element.

According to an embodiment, each elementary cell comprises at least one photodetection element topped with at least a first electrode, a first liquid crystal layer, and a second electrode, the second electrode being transparent, the first electrode being provided to let through a portion only of the incident interfering beam towards the at least one photodetection element, the other portion being reflected.

According to an embodiment, the control device controls the voltage applied between the first and the second electrode.

According to an embodiment, the first electrode is metallic and comprises at least one opening opposite the at least one photodetection element.

According to an embodiment, the first electrode is made of indium-tin oxide (ITO).

According to an embodiment, the second electrode is common to all the elementary cells of the partially-reflective device.

According to an embodiment, the second electrode is made of indium-tin oxide.

According to an embodiment, the system is adapted to a phase modulation of the beam reflected by the partially reflective device, the system further comprising a second liquid crystal layer extending over the first liquid crystal layer, the crystals of the first and of the second liquid crystal layer being parallel nematic crystals, the orientation of the crystals in the second liquid crystal layer being perpendicular to the orientation of the crystals in the first liquid crystal layer.

According to an embodiment, the system is adapted to a phase modulation of the beam reflected by the partially reflective device, the first liquid crystal layer being nematic with a parallel orientation.

According to an embodiment, the system is adapted to an amplitude modulation of the beam reflected by the partially-reflective device, the liquid crystals of the first liquid crystal layer being twisted nematic crystals, a polarizer being placed between the photodetection element and the first electrode, the orientation of the polarizer being parallel to the orientation of the liquid crystal molecules on the polarizer side.

According to an embodiment, the system is adapted to an amplitude modulation of the beam reflected by the partially-reflective device, the liquid crystals of the first liquid crystal layer being nematic with a parallel orientation, a polarizer being placed between the photodetection element and the first electrode, the orientation of the polarizer being at a 45° angle relative to the director of the liquid crystals of the first liquid crystal layer.

According to an embodiment, the system further comprises at least one polarizer placed opposite the partially-reflective device.

According to an embodiment, the control device outputs a temporally-continuous or discrete control signal.

BRIEF DESCRIPTION OF THE DRAWINGS

The foregoing and other features and advantages will be discussed in detail in the following non-limiting description of specific embodiments in connection with the accompanying drawings, among which.

For clarity, the same elements have been designated with the same reference numerals in the different drawings and, further, as usual in the representation of optical structures and of integrated systems, the various drawings are not to scale.

DETAILED DESCRIPTION

Figure 1:
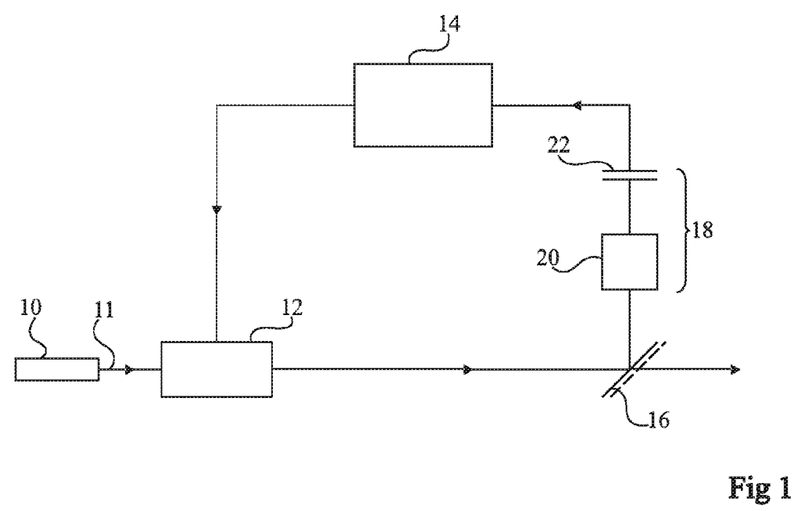
FIG. 1 illustrates a device enabling to control the wavefront of a coherent light beam.

FIG. 1 is a block diagram illustrating an example of a coherent light beam control system.

This system comprises a coherent light source 10 which delivers a beam 11. As a non-limiting example, coherent light source 10 may be a laser source. Beam 11 crosses a correction device 12 controlled by a control device 14. The beam originat-ing from correction device 12 is directed towards a beam splitter 16 which deviates a portion towards a wavefront detection device 18 and which transmits the rest of the beam for a subsequent use (on the right-hand side of the drawing). Detection device 18 comprises a liquid crystal display 20 coupled to a CCD camera 22. The data originating from detection device 18 are transmitted to control device 14.

In operation, the wavefront of the coherent light beam is analyzed, by means of the beam deviated by beam splitter 16, by detection device 18. The data relative to the shape of the wavefront are delivered to control device 14, which determines the correction to be brought to coherent light beam 11 so that it exhibits, at the device output (to the right of the beam splitter), a desired wavefront.

A disadvantage of a system such as that in FIG. 1 is that it dissociates the detection, control, and modulation functions in separate blocks (modulation block 12, detection block 18, and control block 14). Such a device thus necessarily implies a significant latency due to signal transmissions between the different blocks. Further, for the modulation applied to coherent light beam 11 to be efficient, an iterative correction is necessary. Thus, the system of FIG. 1 does not enable to rapidly modulate the wavefront of the coherent light beam, and is not adapted to the modulation of a coherent light beam exhibiting a time-variable wavefront.

Another disadvantage of the device of FIG. 1 is its manufacturing complexity. Indeed, for the wavefront modulation applied to coherent light beam 11 by block 12 to be efficient, the pixels of modulator 12 should be perfectly aligned with those of detector 18, which implies a fine alignment step which is particularly difficult to implement.

Thus, there is a need for a system enabling to combine a detection and a modulation of the wavefront of a coherent light beam, which is easy to manufacture and more efficient than existing devices.

To satisfy this and other needs, the inventors have provided a system comprising an array of pixels which each ensure, independently, the detection of a portion of the wavefront of a coherent light beam and the modulation of a corresponding portion of a reflected beam.

Figure 2:
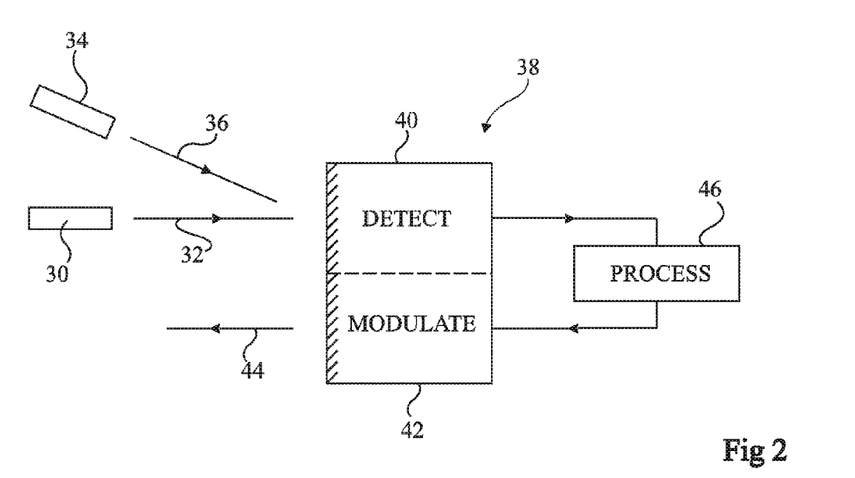
FIG. 2 schematically illustrates the principle of a system for controlling the wavefront of a coherent light beam according to an embodiment.

FIG. 2 schematically illustrates the general operation of a system according to an embodiment.

The system receives a coherent light beam 32 originating from a source 30, for example, a laser source. It is here desired to determine the shape of the wavefront of coherent light beam 32 and to modulate this beam. The system further comprises a second source 34 of a reference light beam 36, coherent with light beam 32. In practice, light beams 32 and 36 may originate from a same source, coherent light beam 32 having been submitted to transformations before reaching the device, for example, through a diffusing medium. Beams 32 and 36 are directed so as to interfere.

The system further comprises a single device 38, partly reflective, simultaneously performing a function 40 (DE-TECT) of detection of the wavefront of the interference beam (between beams 32 and 36) and a function 42 (MODULATE) of modulation of the beam reflected on the device. The structure of the pixels of device 38 will be described in further detail hereafter in relation with FIGS. 3 to 7. Thus, light beam 42 reflected by device 38 exhibits a controlled wavefront. To modulate the reflected light beam, device 38 comprises at least one liquid crystal layer sandwiched between two electrodes, the orientation of the liquid crystals being controlled by the voltage applied between the two electrodes, which enables to perform a phase or amplitude modulation of the reflected beam, as will be seen hereafter.

The system further comprises a processing and calculation device 44 (PROCESS) which receives the data from detection device 40 and which defines, according to the wavefront data detected by the detection device, the phase modulation that modulation device 42 should apply. It should be noted that, unlike what is shown in FIG. 2, detection device 40 and modulation device 42 are integrated in a same single device 38, comprising a pixel array, each pixel being defined to simultaneously detect and modulate the portion of the wavefront that it receives. Advantageously, the device provided herein operates whatever the light source used, provided for the wavelength of this source to be compatible with the characteristics of the detector and of the modulator.

Advantageously, the above-described device enables to perform many processings based on the spatial modulation of the wavefront. Such processings comprise, without this being a limitation, adaptive optical techniques, parallel optical communication channel modulation techniques, or also interferometry techniques. This last application will be described in further detail hereafter.

The use of source 34 of a reference beam 36 coherent with object beam 32 enables to do interferometry between the two beams, and thus to directly access the wavefront of object beam 32. The phase of the object beam received by the device can thus be measured pixel by pixel, and the phase or the amplitude of the wave reflected by the device can be controlled even in response mode.

The phase measurement is performed by the pixels of detector 40, which are sensitive to the intensity of the light field. The superposing, at any point of the detector, of the object wave to be analyzed/processed due to beam 32 of value $U_O = A_O \cdot \exp(i\Phi_O)$ and of the reference wave due to beam 36 of value $U_R = A_R \cdot \exp(i\Phi_R)$ provides, at the level of each pixel of detector 40, an intensity proportional to the cosine of phase $\Phi_O$ of object beam 32, according to the following equation ($\Phi_R$ being the phase of the reference field, which is constant):

$$I = |U_R + U_O|^2 = A_O^2 + A_R^2 + 2A_O A_R \cos(\Phi_R - \Phi_O)$$

Thus, the phenomenon of interference between object and reference beams 32 and 36 enables to directly measure at the level of each pixel the phase shift of incident light beam 32, and thus of the wavefront of this beam.

To perform the modulation, an at least partially reflective layer, defined by pixels, topped with a liquid crystal layer and with a main transparent electrode, is placed in device 40. For each pixel, the orientation of the liquid crystals may be controlled for each pixel, that is, at an elementary level. The incident beam is thus partly reflected by the reflective layer and crosses the liquid crystal layer twice, which enables to modulate it.

Such a basic structure of device 38 enables to modulate the phase of the light beam. It will also be possible, as will be seen hereafter in relation with embodiments, to perform an amplitude modulation by adding at least one polarizer to the system.

FIGS. 3 to 7 illustrate several structures of pixels of a detection and modulation device 38. Such structures provide a fast detection of the wavefront for a feedback action adapted to the desired modulation.

Figure 3:
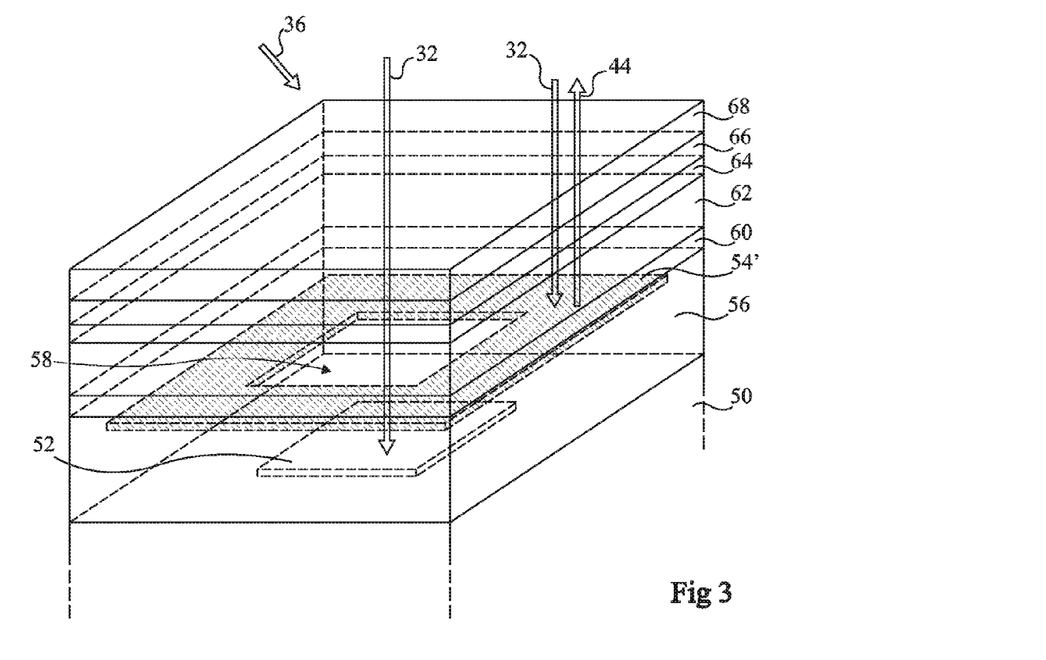
FIGS. 3, 4, and 5 illustrate two alternative embodiments of pixels of a coherent light beam control device according to an embodiment.
Figure 4:
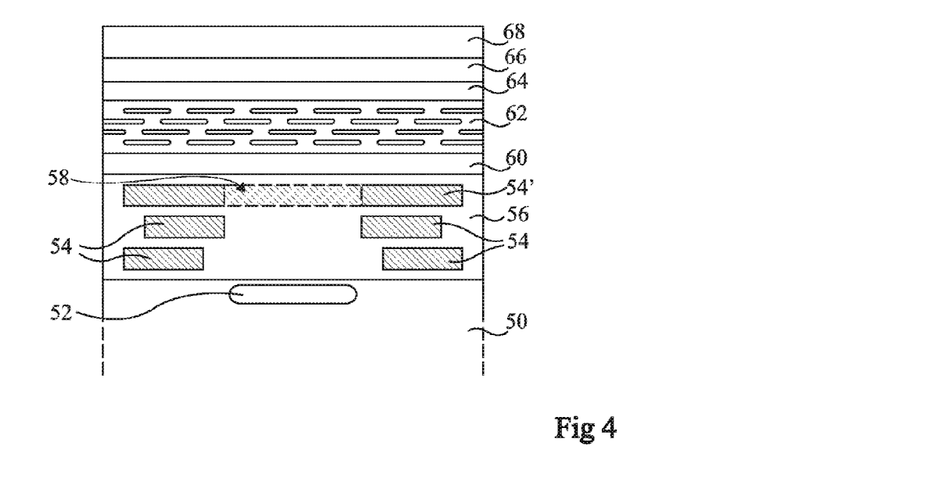

FIGS. 3 and 4 respectively illustrate a perspective view and a cross-section view of a pixel forming a device 38 according to a first embodiment.

The pixel comprises a semiconductor substrate 50 having a photodetection device 52 defined at its surface. The photodetection device may be a photodiode, a fully depleted diode, an avalanche diode, or also a photogate having its photogenerated charge collection area located at the surface of substrate 50.

Substrate 50 is topped with a stack of metallization layers comprising conductive tracks 54 separated by an insulating material 56. For clarity, the conductive tracks of the first metallization levels are not shown in the perspective view of FIG. 3.

An at least partly reflective conductive track 54', which at least partly covers a portion of the pixel, is defined in an upper level of the interconnection stack. In the shown example, region 54' is made of an opaque material, for example, of the same material as the conductive tracks of the lower interconnection levels (generally a metal such as aluminum or copper). An opening 58 is defined in region 54' opposite photodetection area 52. Thus, incident light beams which arrive at the level of opening 58 reach the surface of photodetection area 52, while incident light beams which reach region 54' are reflected by said region. The relative surface areas of region 54' and of opening 58 are selected to reflect a desired proportion of the incident beam, for example, from 40 to 50% of the incident light flow of beam 32.

At the surface of the interconnection stack is formed a stack of a first alignment layer 60 (liquid crystal bonding and alignment layer), of a liquid crystal layer 62, of a second alignment layer 64, and of a transparent conductive layer 66. The stack further comprises as an example an upper glass plate 68. Transparent conductive layer 66 forms a first electrode for controlling the liquid crystals of layer 62, while region 54' forms the second control electrode (counter electrode). Trans-parent conductive layer 66 is made of a conductive material transparent to the considered wavelengths. As an example, trans-parent conductive layer 66 may be made of indium-tin oxide (ITO). The materials of the various layers and regions 56, 60, 62, 64, 66, and 68 and their interfaces are selected to avoid parasitic reflections.

The elements of application of control voltages to electrodes 54' and 66 will not be detailed, the forming of tracks and/or vias of access to electrodes such as electrodes 54' and 66 being well known in integrated circuit techniques.

The application of a voltage between electrodes 54' and 66 enables to modify the structure of the liquid crystals of layer 62, and thus the phase of the reflected light beam. It should be noted that such an adjustment is performed pixel by pixel, a counter electrode 54' being independently defined in each of the pixels.

To perform a phase modulation of the reflected beam, in the structure of FIGS. 3 and 4, a layer of liquid crystals capable of imposing a phase shift to the incident wave is provided, such a phase shift depending on the voltage applied between electrodes 54' and 66. This voltage is defined from the amplitude detected by the detection device.

In an embodiment, nematic crystals having their directors parallel in a plane parallel to the surface of layers 60 and 64 are selected. Alignment layers 60 and 64 are defined to obtain such a liquid crystal distribution. In practice, this means that, if alignment layers 60 and 64 are made of a polymer material such as polyimide, parallel ridges are formed at the surface of these layers, on the side of the liquid crystals, to force their alignment.

A layer of nematic liquid crystals of parallel orientation enables to perform a pure phase modulation of an incident polarized light, the modulation depending on the electric field applied between two electrodes formed on either side of the liquid crystal layer. If the polarization of the incident light is parallel to the direction of the directors of the liquid crystals, the applied voltage is a direct image of the phase shift of the light. Maximum delay $\Delta\Phi$, generated on an incident light of wavelength $\lambda$ by a liquid crystal layer of thickness d and where the difference between ordinary refraction index no and extraordinary refraction index ne can be written $\Delta n$ ($\Delta n = n_o - n_e$), can be expressed as:

$$\Delta\Phi = \frac{2\pi}{\lambda} \Delta n \cdot d$$

$\Delta n$ depending on the applied voltage. Thus, for the provided system which acts on the reflected light beam, after a return travel in the liquid crystal layer, the generated phase shift will thus be equal to $2\Delta\Phi$.

It should be noted that the difference between ordinary and extraordinary indexes $\Delta n$ of the crystal and their variation according to the applied voltage is a characteristic of the liquid crystal molecules used, and typically varies from 0.1 to 0.2. The selection of the molecules thus provides freedom as to the thickness of the liquid crystal layer for a phase modulation of the reflected beam.

It should be noted that, for this first embodiment, the incident light (beam 32) should be polarized in alignment with the orientation of the liquid crystals. Indeed, to apply a phase modulation, it is necessary for the polarization of the incident light to be parallel to the direction of the directors of the liquid crystal molecules.

Figure 5:
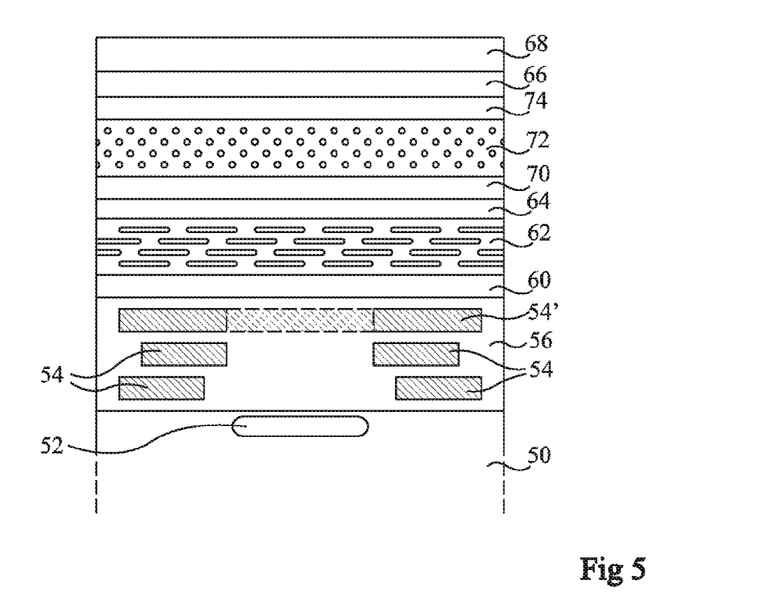

To do away with such a constraint, a second alternative embodiment illustrated in FIG. 5 may be used.

In the device of FIG. 5, each pixel comprises a semiconductor substrate 50 having a photodetection device 52 defined at its surface. Substrate 50 is topped with a stack of metallization layers comprising conductive tracks 54 separated by an insulating material 56. In an upper level of the interconnection stack is defined an at least partly reflective conductive region 54', which covers a portion of the pixel. In the example of FIG. 5, region 54' is made of an opaque material, for example, metallic, and an opening 58 is defined in region 54' opposite photodetection area 52.

At the surface of the interconnection stack is formed a stack comprising:
 a first alignment layer 60 for a first liquid crystal layer,
 a first liquid crystal layer 62,
 a second alignment layer 64 for first liquid crystal layer 62,
 a first alignment layer 70 for a second liquid crystal layer,
 a second liquid crystal layer 72,
 a second alignment layer 74 for second liquid crystal layer 72,
 a transparent conductive layer 66, and
 a protective glass plate 68.

Transparent conductive layer 66 forms a first electrode for controlling the positioning of the liquid crystals of layers 62 and 72, while region 54' forms the second control electrode. As in the case of the structure of FIGS. 3 and 4, the element of application of a control voltage between electrodes 54' and 66 will not be described in detail.

The device of FIG. 5 enables to perform a phase modulation of the wave reflected by the pixel (on layer 54'), without requiring for the incident waves to have a specific polarization. To achieve this, the liquid crystals of layers 62 and 72 should be oriented in directions parallel to the surface of the layers, and in perpendicular directions (the liquid crystals of layer 62 have their directors, in top view, perpendicular to the directors of the liquid crystals of layer 72). It should be noted that, as a variation, alignment layers 64 and 70 may be gathered in a single layer, for example, made of a polymer.

According to the voltage applied to electrodes 54' and 66, the liquid crystals of layers 62 and 72 orient, which enables to modulate the phase of the light reflected by electrode 54'. Publication "Polarization-independent liquid crystal phase modulator using a thin polymer-separated double-layered structure", OPTICS EXPRESS, 31 Oct. 2005, Vol. 13, No. 22 (8746), specifies values of the voltages to be applied to a stack of two liquid crystal layers to obtain a desired phase modulation of the light beam.

In this second embodiment, the phase modulation is performed independently from the polarization of the incident light. Indeed, liquid crystal layers 62 and 72 enable to modulate all the field components in the same way.

It can also be shown that the phase delay introduced by the intermediate layers (64, 70) between the two liquid crystal layers compensates, which enables to keep the same phase-shift dynamics.

The above-described systems enable to provide a phase modulation at the level of each pixel. To provide an amplitude modulation, it may be provided to add to the system one or a plurality of polarizers delivering different amplitudes for waves having different phase shifts.

For example, in a device comprising pixels similar to that of FIGS. 3 and 4, a polarizer may be interposed between interconnection stack 56 and alignment layer 60. The crystals of liquid crystal layer are provided (due to alignment layers 60 and 64) to be in twisted nematic phase. A polarizer is placed in front of the device, in the interference area between beams 32 and 36 (or integrated at the surface of the device). When a potential is applied on either side of the liquid crystal layer, the helix of the liquid crystals rotates more or less, which, with the association of the polarizer, modifies the amplitude of the reflected beam. In this example, the polarizer interposed between layers 56 and 60 is oriented perpendicularly to the polarizer placed in front of the device, and the interposed polarizer is oriented in a direction parallel to the direction of the liquid crystals at the interface with layer 60.

A device similar to that of FIGS. 3 and 4, where a polarizer is interposed between interconnection stack 56 and alignment layer 60, may also be considered. The crystals of the liquid crystal layer are provided in this variation to be in parallel alignment nematic phase (due to alignment layers 60 and 64). A polarizer is placed in front of the device, in the interference area between beams 32 and 36 (or integrated at the surface of the device). The polarizers are oriented with a 45° angle relative to the orientation of the liquid crystals and are placed at a 90° angle relative to each other.

In this last variation, the intensity reflected by the device can be written as:

$$I = \sin^2\left(\frac{2\pi d \Delta n}{\lambda}\right) I_0,$$

$I_0$ being the intensity incident on device, $\lambda$ the wavelength of the light beam, d the thickness of layer 62, and $\Delta n$ the difference between ordinary refraction index $n_o$ and extraordinary refraction index $n_e$ of the liquid crystals. The amplitude of the reflected beam thus is a direct function of the voltage applied on either side of liquid crystal layer 62.

One or a plurality of polarizers may similarly be associated with the structure of FIG. 5 to obtain an amplitude modulation.

Figure 6A:
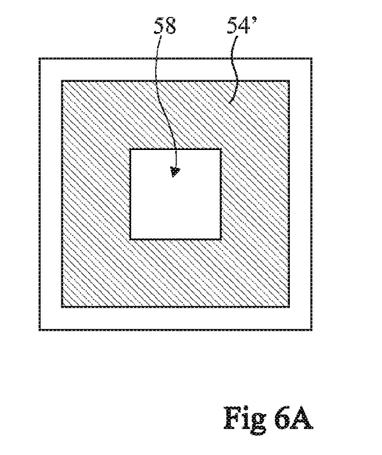
FIGS. 6A and 6B illustrate the alternative embodiments of counter electrodes according to an embodiment.
Figure 6B:
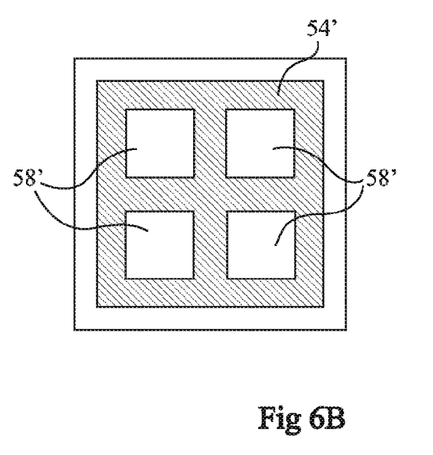

FIGS. 6A and 6B illustrate, in top view, two alter-native embodiments of a lower electrode 54' formed above a pixel of a coherent light beam detection and modulation device 38.

FIG. 6A shows electrode structure 54' of FIGS. 3, 4, and 5, that is, for each pixel of the detector, electrode 54' comprises a peripheral reflective region having an opening 58 formed opposite a photodetection area 52 defined in its middle.

In FIG. 6B, structure 54' differs from that of FIG. 6A in that a plurality of openings 58' are defined in the reflective region. In practice, each opening 58' may be associated with an independent photodetector formed in substrate 50. Thus, each pixel, having its surface area defined by the size of electrode 54', comprises a plurality of photodetectors. This structure may be advantageous, for example, in the case where a plurality of measurements per pixel are necessary. The different measurements can thus be performed simultaneously. Other alternative embodiments of counter electrode 54' may also be provided. Particularly, the number and the shape of openings 58/58' may be different from those provided herein.

Figure 7:
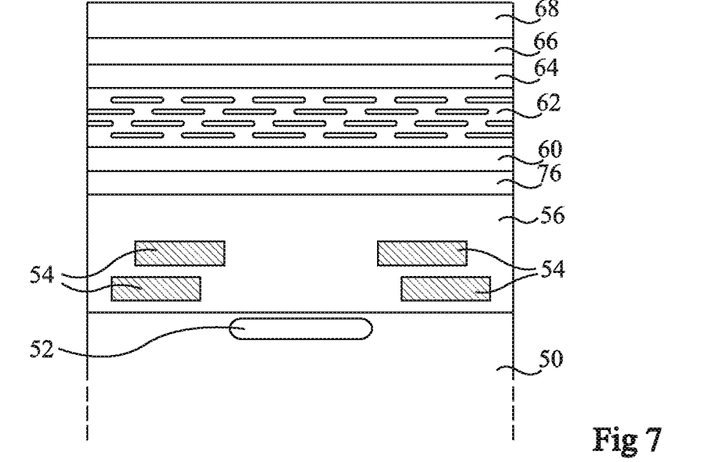
FIG. 7 illustrates another alternative embodiment of pixels of a coherent light beam control system according to an embodiment.

FIG. 7 illustrates another embodiment of a pixel of a device 38.

The pixel illustrated in FIG. 7 is similar to that of FIGS. 3 and 4, except as concerns lower electrode 54', which is absent from FIG. 7. In this embodiment, this electrode is replaced with a transparent conductive layer 76 which is placed between interconnection stack 56 and alignment layer 60.

The material of transparent conductive layer 76 is selected with adapted reflection and transmission coefficients so that a portion of the incident light beam reaches one or a plurality of underlying photodetection areas and that another portion is reflected and modulated as desired. As an example, transparent conductive electrode 76 may be made of indium-tin oxide (ITO) and have a thickness in the range from 50 to 100 nm. Indeed, this material is well adapted to transmitting part of the incident light rays towards the underlying reflection and photodetection areas. In this case, as previously, the reflective layer may be a dielectric or a metal.

The variation of FIG. 7 can allow an amplitude or phase modulation, if the liquid crystal layer is provided as described in relation with FIGS. 3 and 4. It may also be provided to combine the variations of FIGS. 5 and 7, by forming a second layer of liquid crystals properly oriented at the surface of layer 62, to form a device enabling to modulate the phase of the beam reflected by the device. The operation of such devices (the orientation of the liquid crystals in the liquid crystal layer(s) being defined in adapted fashion) being similar to the above operations, it will not be described in detail again herein. It should also be noted that, in the variation of FIG. 7, the processing and calculation device should be adapted to take into account the fact that the signal received by the photodetection areas is influenced by a passage through liquid crystal layer 62 submitted to a control voltage.

Advantageously, the system provided herein ensures a greater detection/modulation reactivity than known devices, since the two functions are integrated in a same device, and this, in compact fashion. Further, the integration of these two functions directly within the detection pixels eliminates the alignment issues of previously-provided devices.

Figure 8:
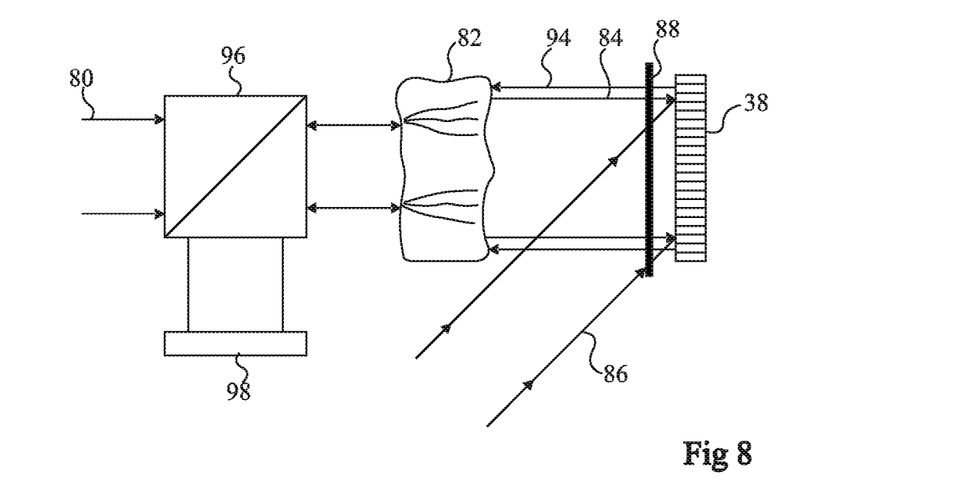
FIG. 8 illustrates an application of a device according to an embodiment.

FIG. 8 illustrates a possible application of a device according to an embodiment to a coherent light beam focusing system.

In this example of application, a coherent light beam 80, for example, a laser beam, reaches a diffusing medium 82. Diffusing medium here means an inhomogeneous medium disturbing the propagation of a wave, for example, a rough interface such as ground glass, a turbid medium such as milk or a biological medium, or also a strongly-diffusing medium such as white paint. As it comes out of the diffusing medium (in reflection or transmission), obtained beam 84 is strongly deformed and is transmitted to an analysis and modulation device 38 such as described hereabove. A reference light beam 86, coherent with beam 80 (for example, originating from the same source as beam 80), is provided to interfere with beam 84 at the level of the detector of device 38. Device 38 is associated with a processing and calculation device, not shown. As described hereabove, beam 94 reflected by device 38 may be phase and/or amplitude modulated. To achieve this, a polarizer 88 may be placed opposite device 38, as previously described.

Advantageously, the detection of the beam by detection device 40 of device 38 enables to know the effect of diffusing medium 82 on the light beam. Once this effect is known, a phase and/or modulation algorithm may be applied so that beam 94 reflected by device 38 is adapted to this medium. It may in particular be provided to apply an algorithm enabling to focus the reflected light beam onto a predetermined point through or inside of the diffusing medium.

Such a solution may be particularly advantageous in the medical field, and more particularly for the treatment of patients implementing the focusing of coherent light beams. Indeed, it may be provided to simultaneously determine the nature of a diffusing medium such as a portion of the human body, and to focus the reflected beam on a portion of this diffusing medium, for example, to destroy a diseased cell or area.

It may also be provided for device 38 to ensure a phase conjugate function 94. Such a function enables to focus the reflected beam on the source of the incident light beam. In this case, the phase of the object field, $\phi_{OBJET}$, is determined, after which a phase equal to $-\phi_{OBJET}$ is imposed on the modulator. A phase shift enables, as a variation, to displace the focusing point of the reflected beam.

As an example, in the case where the phase of a frequency-modulated signal is desired to be measured, the phase of the object field, $\phi_{OBJET}$, may be measured by a method of phase-shift interferometry based on the recording of a plurality of measurements called holograms. This measurement may be performed with 2, 3, or 4 holograms. In the case of a two-hologram measurement, two holograms having their reference phase shifted by π are recorded.

In this case, the intensity for each hologram on the pixels is, with the same notations as previously:

$$I_0 = |U_0|^2 = A_0^2 + A_R^2 + 2A_0 A_R \cos(\Phi_R(0) - \Phi_0)$$

$$I_\pi = |I_\pi|^2 = A_0^2 + A_R^2 + 2A_0 A_R \cos(\Phi_R(\pi) - \Phi_0)$$

Phase $\Phi_0$ can thus be obtained by writing difference $I_0 - I_\pi$:
$I_0 - I_\pi = 4 A_0 A_R \cos(\Phi_0)$, and thus:

$$\Phi_0 = \arccos\left(\frac{I_0 - I_\pi}{4\sqrt{A_0 A_R}}\right).$$

Value $-\Phi_0$ to be applied for the modulation of the reflected beam is thus determined. It should be noted that, for a method with four holograms, the reference phase will be shifted between each hologram by π/2 and, for a method with three holograms, the reference phase will be shifted between each hologram by 2π/3.

In the case where the signal is not frequency-modulated, the phase of the object field, $\phi_{OBJET}$, simply corresponds to the measured intensity.

It should be noted that this interferometry method is particularly adapted to the forming of liquid crystal control electrodes such as that in FIG. 6B. Indeed, it may be provided for the different photodetection areas to simultaneously perform the above acquisitions.

FIG. 8 shows a beam splitter cube 96 which is positioned between beam 80 and diffusing medium 82. The splitter cube is provided to divert part of the reflected beam coming out of diffusing medium 82 towards a second detector 98 which enables, if desired, to perform a measurement in another plane that that of detection and modulation device 38.

Another alternative application of a device such as provided herein comprises placing two or more elementary bricks of devices 38, associated with reference sources. Particularly, it may be provided to place two devices 38 opposite each other, a beam being brought onto a first one of these devices, for example, by a beam splitter. The beam originating from the first device is modulated, by means of a detection of interferometry with a reference source, and is sent back towards a second device 38. The latter sends back a wave modulated as desired towards first device 38, and so on. Particularly, by placing a diffusing medium between the two devices 38, such a device enables to converge towards a maximum transmission mode of the diffusing medium.

The modulation devices provided hereabove may also be used for a wide range of applications, to perform a wavefront detection in parallel with a modulation of this wavefront (possibly with an intermediate calculation step). Such devices may particularly be used to qualify transfers in optical fibers, and to verify that a matching of the optical fibers actually corresponds to a desired aim.

In all the above applications, the modulation device may have any state, known or not, during the measurement phases.

Specific embodiments have been described. Various alterations and modifications will occur to those skilled in the art. Although the use of liquid crystals, and as an example, of nematic liquid crystals, have been provided, any other structure capable of giving a light wave a variable phase shift as a response to a control signal may be used. Further, various embodiments with different variations have been described hereabove. It should be noted that those skilled in the art may combine various elements of these various embodiments and variations without showing any inventive step.

The invention claimed is:
1. A system for measuring and controlling the wavefront of a coherent light beam, comprising:

a device for generating a reference light beam coherent with said coherent light beam;

a partially reflective monolithic device comprising an array of elementary cells, each elementary cell comprising at least one element for measuring a portion of the incident wave interfering between the coherent light beam and the reference light beam and an element for modulating the phase of the reflected beam; and a control device for controlling said phase modulation element making use of the information from the associated measurement element, wherein each elementary cell comprises at least one photodetection element topped with at least a first electrode, a first liquid crystal layer and a second electrode, the second electrode being transparent, the first electrode being provided to let through a portion only of the incident interfering beam towards said at least one photodetection element, the other portion being reflected.

2. The system of claim 1, wherein the control device controls the voltage applied between the first and the second electrode.

3. The system of claim 1, wherein the first electrode is metallic and comprises at least one opening opposite said at least one photodetection element.

4. The system of claim 3, adapted to a phase modulation of the beam reflected by the partially reflective device, the system further comprising a second liquid crystal layer extending over the first liquid crystal layer, the crystals of the first and of the second liquid crystal layer being parallel nematic crystals, the orientation of the crystals in the second liquid crystal layer being perpendicular to the orientation of the crystals in the first liquid crystal layer.

5. The system of claim 4, adapted to a phase modulation of the beam reflected by the partially reflective device, wherein the first liquid crystal layer is nematic with a parallel orientation.

6. The system of claim 1, wherein the first electrode is made of indium-tin oxide (ITO).

7. The system of claim 6, adapted to a phase modulation of the beam reflected by the partially reflective device, the system further comprising a second liquid crystal layer extending over the first liquid crystal layer, the crystals of the first and of the second liquid crystal layer being parallel nematic crystals, the orientation of the crystals in the second liquid crystal layer being perpendicular to the orientation of the crystals in the first liquid crystal layer.

8. The system of claim 7, adapted to a phase modulation of the beam reflected by the partially reflective device, wherein the first liquid crystal layer is nematic with a parallel orientation.

9. The system of claim 1, wherein the second electrode is common to all the elementary cells of the partially reflective device.

10. The system of claim 2, wherein the second electrode is made of indium-tin oxide.

11. The system of claim 10, adapted to a phase modulation of the beam reflected by the partially reflective device, the system further comprising a second liquid crystal layer extending over the first liquid crystal layer, the crystals of the first and of the second liquid crystal layer being parallel nematic crystals, the orientation of the crystals in the second liquid crystal layer being perpendicular to the orientation of the crystals in the first liquid crystal layer.

12. The system of claim 11, adapted to a phase modulation of the beam reflected by the partially reflective device, wherein the first liquid crystal layer is nematic with a parallel orientation.

13. The system of claim 2, adapted to a phase modulation of the beam reflected by the partially reflective device, the system further comprising a second liquid crystal layer extending over the first liquid crystal layer, the crystals of the first and of the second liquid crystal layer being parallel nematic crystals, the orientation of the crystals in the second liquid crystal layer being perpendicular to the orientation of the crystals in the first liquid crystal layer.

14. The system of claim 9, adapted to a phase modulation of the beam reflected by the partially reflective device, the system further comprising a second liquid crystal layer extending over the first liquid crystal layer, the crystals of the first and of the second liquid crystal layer being parallel nematic crystals, the orientation of the crystals in the second liquid crystal layer being perpendicular to the orientation of the crystals in the first liquid crystal layer.

15. The system of claim 14, adapted to a phase modulation of the beam reflected by the partially reflective device, wherein the first liquid crystal layer is nematic with a parallel orientation.

16. The system of claim 1, adapted to a phase modulation of the beam reflected by the partially reflective device, wherein the first liquid crystal layer is nematic with a parallel orientation.

17. The system of claim 1, adapted to an amplitude modulation of the beam reflected by the partially-reflective device, wherein the liquid crystals of the first liquid crystal layer are twisted nematic crystals, a polarizer being placed between the photodetection element and the first electrode, the orientation of the polarizer being parallel to the orientation of the liquid crystal molecules on the polarizer side.

18. The system of claim 17, further comprising at least one polarizer placed opposite the partially reflective device.

19. The system of claim 1, adapted to an amplitude modulation of the beam reflected by the partially reflective device, wherein the liquid crystals of the first liquid crystal layer are nematic with a parallel orientation, a polarizer being placed between the photodetection element and the first electrode, the orientation of the polarizer being at a 45° angle relative to the director of the liquid crystals of the first liquid crystal layer.

20. The system of claim 1, wherein the control device outputs a temporally continuous or discrete control signal.

* * * * *